United States Patent
Sundaram et al.

(10) Patent No.: US 10,366,035 B2
(45) Date of Patent: Jul. 30, 2019

(54) SINGLE WIRE COMMUNICATION BOARD-TO-BOARD INTERCONNECT

(71) Applicant: Intel Corporation, Santa Clara, CA (US)

(72) Inventors: Arvind Sundaram, Bangalore (IN); Ramaswamy Parthasarathy, Bangalore (IN); Vikas Mishra, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 15/473,330

(22) Filed: Mar. 29, 2017

(65) Prior Publication Data

US 2018/0287239 A1 Oct. 4, 2018

(51) Int. Cl.
| | |
|---|---|
| *H01P 3/10* | (2006.01) |
| *G06F 13/40* | (2006.01) |
| *H01P 5/08* | (2006.01) |
| *G06F 13/42* | (2006.01) |
| *H01P 5/02* | (2006.01) |

(52) U.S. Cl.
CPC ...... *G06F 13/4068* (2013.01); *G06F 13/4282* (2013.01); *H01P 5/026* (2013.01); *H01P 5/08* (2013.01); *Y02D 10/14* (2018.01); *Y02D 10/151* (2018.01)

(58) Field of Classification Search
CPC ....................................................... H01P 3/10
See application file for complete search history.

(56) References Cited

U.S. PATENT DOCUMENTS

| | | | |
|---|---|---|---|
| 6,384,700 B1 * | 5/2002 | Craine | H01Q 1/28 333/240 |
| 2004/0169572 A1 * | 9/2004 | Elmore | H01P 3/10 333/240 |
| 2008/0211727 A1 * | 9/2008 | Elmore | H01P 3/10 343/773 |

OTHER PUBLICATIONS

Georg Boubau, Surface Waves and their Application to Transmission Lines (Year: 1950).*
Akalin, Treizebre and Bocquet, Single-Wire Transmission lines at Terahertz Frequencies (Year: 2006).*
NTNU Waveguide Propagation (Year: 2006).*
Glenn Elmore, Introduction to Propagating Wave on a Single Conductor (Year: 2009).*

* cited by examiner

*Primary Examiner* — David E Martinez
(74) *Attorney, Agent, or Firm* — Schwegman Lundberg & Woessner, P.A.

(57) ABSTRACT

A solution to the technical problem of improving device-to-device connection speeds includes the use of single-wire communication (SWC). Unlike the two differential wires required in transmission lines, SWC includes a transmission method using a single wire for data without requiring a return wire. The use of SWC has the potential to enable low loss channels of increasingly high bandwidth. The SWC improvements in bandwidth and frequency enable a significant reduction of power required for communication. SWC provides significant improvement in speed for each channel, so fewer wires may be used for each device-to-device connection. SWC also provides the ability to convey increased bandwidth and increased power over each wire, which further reduces the number of wires needed to provide power and communication.

22 Claims, 11 Drawing Sheets

SINGLE WIRE COMMUNICATION BOARD-TO-BOARD INTERCONNECT

TECHNICAL FIELD

Embodiments described herein generally relate to board-to-board interconnections.

BACKGROUND

There is a demand for increasingly higher input/output (IO) bandwidth on devices and device cables. For example, USB 3.1 includes data throughput speeds up to 10 Gbps, and future device cables increase the speed requirements to 25 Gbps or more. However, existing device cables like USB 3.1 include a differential cable pair and a differential impedance, both of which include conventional transmission lines, which require significant power and voltage swing (e.g., minimum and maximum voltage values) so that the receiving device can operate reliably. Further, as the length of the device cable increases, the transmission loss increases and the data throughput decreases. In an example, for USB 3.1, the loss may be too great beyond a cable length of eight or ten inches that USB 3.1 throughput cannot be maintained. A ten-inch cable distance may be required before a signal leaves a computer housing: a signal may need to be taken out from a central processing unit (CPU) to the edge of the printed circuit board (PCB), then to the computer chassis, then to the cable connector, which may meet or exceed a ten-inch cable maximum. Existing solutions to address this cable requirement may include using re-drivers or re-timers, but these solutions are power-hungry and require PCB board space, which offset the advantages of high-speed lines.

DESCRIPTION OF EMBODIMENTS

Figure 1:
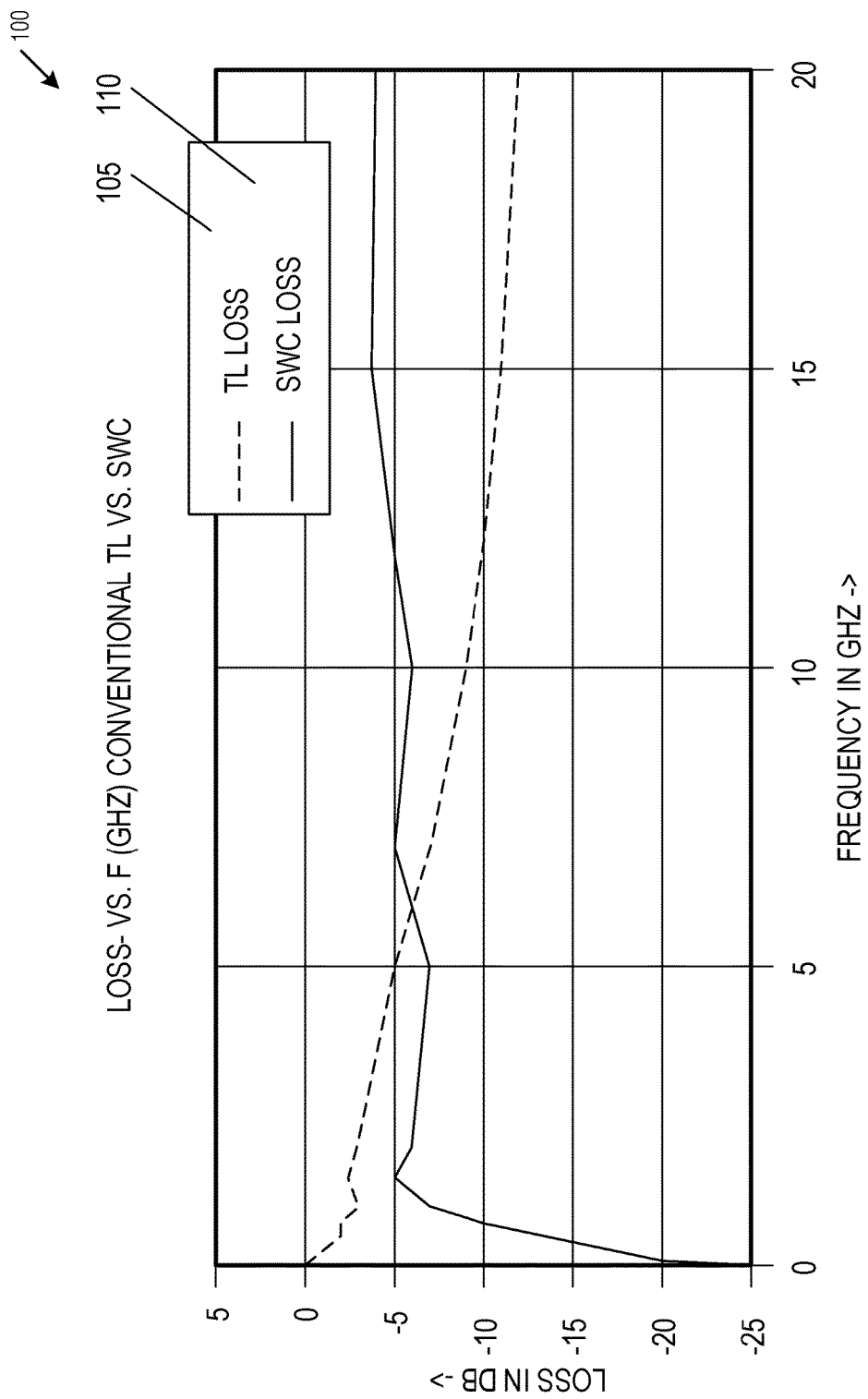
FIG. 1 is a graph contrasting transmission line (TL) loss with SWC loss, in accordance with at least one embodiment of the invention.

A solution to the technical problem of improving device-to-device connection speeds includes the use of single-wire communication (SWC) connections as described herein. Unlike the two differential wires required in typical transmission lines, SWC connections leverage a transmission method using a single wire for data without requiring a return wire (e.g., differential wire, ground wire). The use of the SWC connections described herein has the potential to enable low loss channels of increasingly high bandwidth, such as bandwidth greater than 40 Gbps. SWC connections also provides a substantially flat frequency response through 20 GHz and beyond, as discussed more fully below.

The use of SWC connections as described herein offers various additional advantages. The SWC connection provides improvements in bandwidth and frequency, which enables a significant reduction of power required for communication. For example, the power required to generate the desired electromagnetic (EM) field to drive the signal (e.g., an order of magnitude lower) than the power required for a typical transmission line. The use of lower power enables a reduction in IO voltage and current levels, which simplifies the IO design and improves compatibility with deep silicon IO levels. The SWC connection provides a significantly reduced frequency-dependent loss (e.g., a 5-10 dB reduction) relative to conventional transmission line realized on PCB, which further simplifies IO design. SWC connections provide significant improvement in speed for each channel (e.g., per-lane speeds), so fewer wires may be used for each device-to-device connection. SWC connections also provide the ability to convey increased bandwidth and increased power over each wire, which further reduces the number of wires needed to provide power and communication. Because SWC connections provide the ability to conduct communication at higher bandwidths over longer connections, new device designs will have more flexibility in the size and connection lengths used. Additionally, SWC connections provide the ability to conduct communication without requiring electro-optical IO conversion. For example, optical communication requires conversion from electrical signals to optical signals, transmission of the optical signals, and conversion of the optical signals back to electrical signals. SWC connections convey electrical signals at increased bandwidth without requiring electrical additional IO electro-optical conversion hardware and without introducing electro-optical IO conversion errors.

The SWC connections described herein may be used to improve device-to-device communication, or may be used to improve various existing implementations or protocols. When used with body area networking, these SWC connections enable new usage models, and provide a higher bandwidth channel through the body. When used with near-field communication (NFC), SWC may be used to enable a higher bandwidth protocol-agnostic wireless NFC improvement, where the SWC-based NFC may improve conventional NFC bandwidth by two orders of magnitude (e.g., 100× improvement in bandwidth).

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a graph contrasting transmission line (TL) loss with SWC loss 100, in accordance with at least one embodiment of the invention. Graph 100 shows TL loss 105 and SWC loss 110 in decibels (dB) as a function of increasing frequency in GHz. TL loss 105 exhibits increasing loss as the frequency increases, and provides limited use in high-frequency applications. Because TL communication provides limited bandwidth and requires lower frequencies, TL communication uses multiple communication lanes (e.g., multiple wires). Additionally, TL communication uses differential communication to reduce crosstalk, so each communication lane requires two wires. For TL communication systems that require higher bandwidth therefore require many communication lanes, and increased communication signal driver power is required to compensate for the increased TL loss 105. For example, a USB 3.1 link using TL communication may include a practical limitation of requiring TL communication to be less than ten inches.

In contrast with TL loss 105, SWC loss 110 provides lower loss and less variability at increasing high frequencies. Unlike the differential signals used in TL communication, SWC provides increased bandwidth over a single wire. Further, SWC may use a single wire to convey both data and power. However, SWC requires specific electrical and mechanical configurations to provide for practical implementations, such as the implementation shown in FIG. 2.

Figure 2:
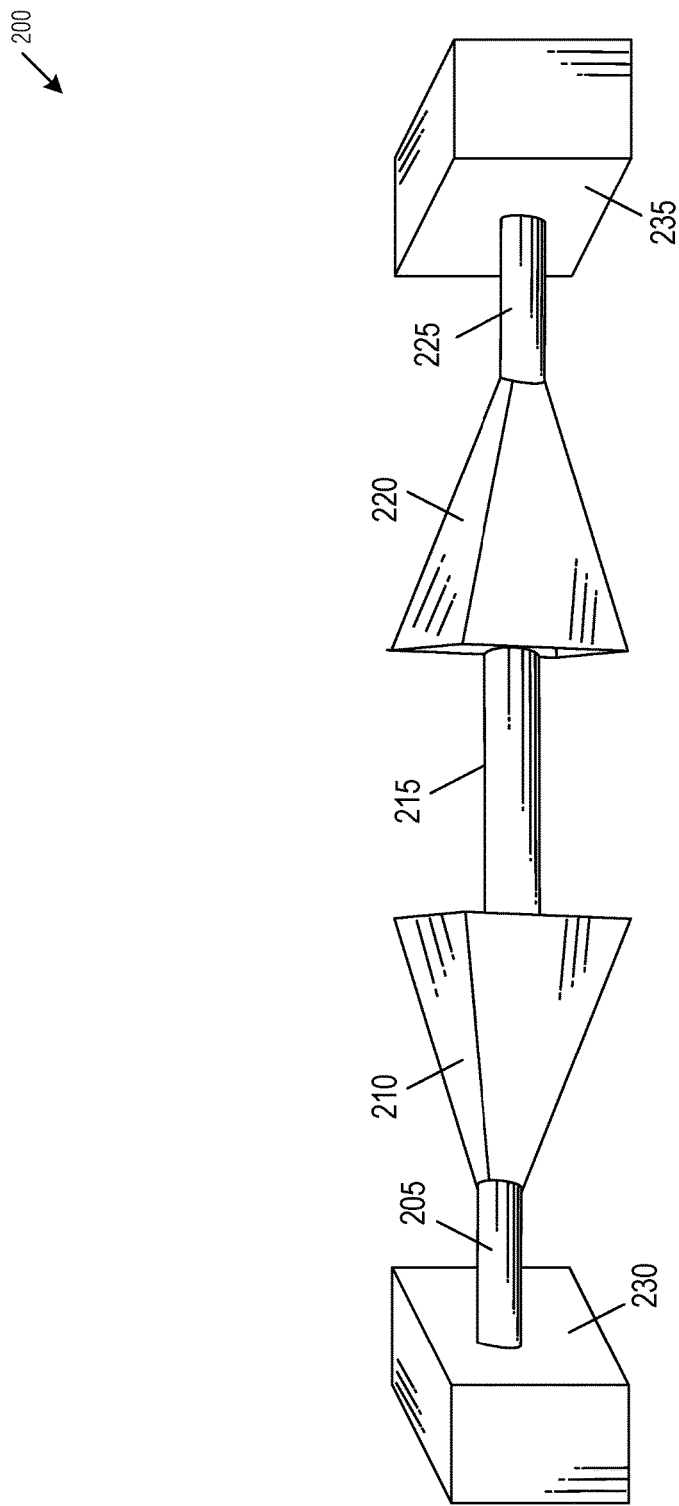
FIG. 2 is a diagram of a SWC line, in accordance with at least one embodiment of the invention.

FIG. 2 is a diagram of a SWC line 200, in accordance with at least one embodiment of the invention. SWC line 200 includes a first coaxial cable 205, a first horn (e.g., launcher, first hollow cone) 210, a signal conductor line 215, a second horn (e.g., second hollow cone) 220, and a second coaxial cable 225. In an embodiment, the first coaxial cable 205 is connected to a first memory module 230, and the second coaxial cable 225 is connected to a second memory module 235 to provide improved communication between the first memory module 230 and the second memory module 235. The first horn 210 and the second horn 220 may be shaped like a square pyramid, may be conical in shape, or may have another beam-forming structure. Unlike a TL signal that is internal to a wire, SWC line 200 transmits communication signals using transverse electromagnetic (TEM) waves propagating on the outer surface of the signal conductor line 215. In an embodiment, the signal conductor line 215 is coated with a dielectric material, where the dielectric material helps guide the TEM waves along the signal conductor line 215. To improve or maximize the efficiency of TEM wave propagation on the outer surface of the signal conductor line 215, the first horn 210 and the second horn 220 may be selected to be substantially symmetrical in structure.

To improve propagation, the signal conductor line 215 may be terminated to appear as an infinite transmission line, such as using differential lines, a singular termination, a power termination, an AC termination, or other termination. The termination may be tuned from 50 ohms to 300 ohms, and may be tuned based on interface, based on manufacturing tolerances, based on signal carrier frequency, based on a specific termination logic using a magnetic or electric field, or based on other tuning factors. The termination may be selected based on the type of devices used in communication. For example, the SWC line 200 configuration may be used in a board-to-board structure where you want the signal to stay within the board or to travel between two PCB substrates (e.g., FR4 substrates), where the signal conductor line 215 stays buried within the board within a specific shielding structure. Additional structures may be needed to provide alternate shielding or impedance for implementations between two integrated circuits (ICs) not mounted on a common PCB. For example, a ball grid array (BGA) connection may include a columnar structure that includes at least one first horn 215 in a vertical configuration.

Various combinations of first horn 210, second horn 220, and signal conductor line 215 may be implemented based on the electronic device PCB configuration to enable propagation on the outer surface of the signal conductor line 215. For example, the configuration may be modified when the first horn 210 is implemented at the edge of a PCB. When the first horn 210 is implemented on the edge of a PCB, the signal conductor line 215 may be connected to the first horn 210 through a connector, allowing signal conductor line 215 to be attached or detached from the first horn 210. For PCB implementations, the outside faring of the first horn 210 may be 1 mm in diameter. However, the use of an external connector requires a specific configuration to retain the cable within the first horn 210 and avoid crosstalk among nearby SWC lines. Similarly, any parallel SWC lines in close proximity may result in a significant amount of electromagnetic coupling where the signal conductor line 215 exits the first horn 210, resulting in an increased possibility of crosstalk at the exit of the first horn 210. The coupling of the transverse electromagnetic (TEM) communication mode may be used to increase coupling efficiency between the first cable 205 and the second cable 225, however the increased coupling also increases crosstalk. In an embodiment, this crosstalk mitigation is accomplished using a specific coating for the signal conductor line 215 or a ground contact with a selected capacitance, such as shown and described in FIGS. 3-4 below.

Figure 3:
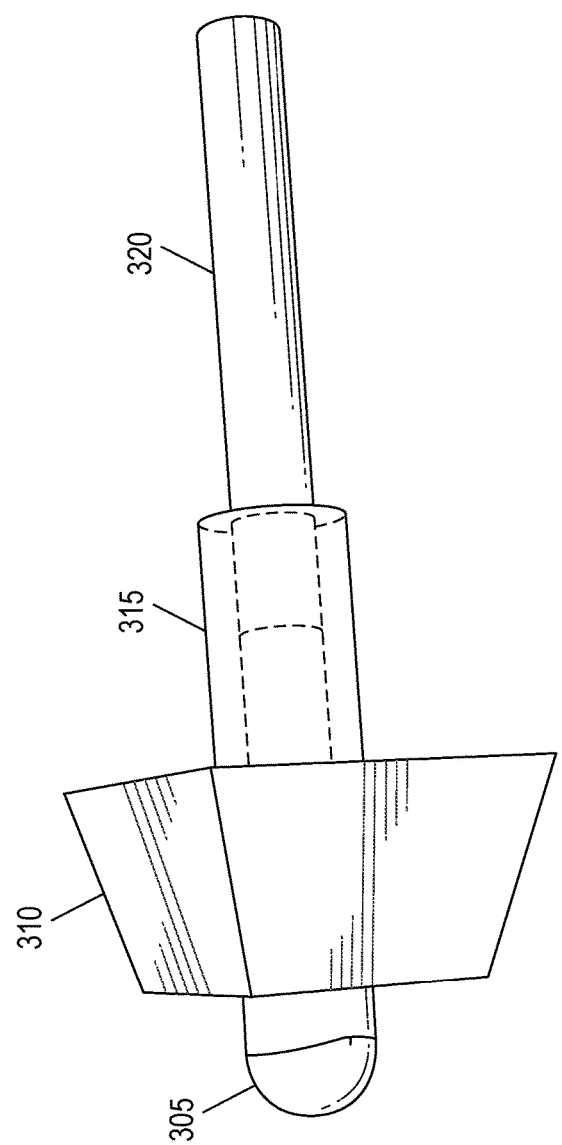
FIG. 3 is a diagram of a first SWC contact, in accordance with at least one embodiment of the invention.

FIG. 3 is a diagram of a first SWC contact 300, in accordance with at least one embodiment of the invention. The structure and materials within the SWC contact 300 may be selected to reduce or eliminate crosstalk between or among nearby SWC lines. SWC contact 300 includes a contact pin 305, such as a fixed contact or a spring-loaded pogo pin contact. The contact pin 305 is surrounded by an overmolding 310, where overmolding 310 may be formed from a dielectric material or ferroelectric material (e.g., barium titanate) that provides strong capacitive coupling between the overmolding 310 and a corresponding horn launcher receptacle (not shown). The shape of the overmolding 310 and contact pin 305 allow them to fit within the corresponding horn launcher receptacle. In an embodiment, the overmolding 310 includes an exterior surface structured to match an interior surface of a horn launcher receptacle, where overmolding 310 creates a removable friction fit when inserted within the horn launcher receptacle. In various embodiments, the overmolding 310 is formed as a partial square pyramid (i.e., frustum) as shown in FIG. 3, as another partial or full conic solid (e.g., cone, pyramid), or another structure that would provide a tight but removable friction fit within a corresponding horn launcher.

SWC contact 300 includes a conductive wire 320 conductively coupled to the contact pin 305. The SWC contact 300 further provides substantial power transfer capabilities along the conductive wire 320. Many communication modalities require two conductors, such as the signal line and ground line (e.g., ground return, coaxial ground braid) or the use of a pair of differential conductors within differential signaling. In contrast with these two-conductor solutions, the SWC contact 300 does not have a requirement for a second conductor. As described above, the SWC contact 300 operates using the skin effect (e.g., operates as a skin carrier) by transmitting communication signals using TEM waves propagating on the outer surface of the signal conductor line. Because the outer surface of the signal conductor line is used to convey the TEM waves, the inner portion of the signal conductor line is available to carry current. Because the direct current on the inner portion of the signal conductor line does not interfere with the propagating TEM waves, the current may be limited only by the ampere capacity (e.g., conductor material, cross-section size) of the signal conductor line. In an example, SWC contact 300 may be used to communicate at speeds of 1 Tbps while conveying tens of watts or hundreds of amps.

SWC contact 300 may be one of many such SWC contacts implemented in a device. Any SWC contact 300 that includes a horn launcher may radiate electromagnetic interfere (EMI) that interferes with nearby SWC contacts or other electronic components. The EMI between or among multiple SWC contacts may be known as crosstalk. The magnitude of the EMI may be strongest near the location where a SWC contact exits a horn launcher, and the EMI magnitude may decrease exponentially with increased distance from the horn launcher. A shield 315 is used to reduce or eliminate this crosstalk, where shield 315 covers a portion of the conductive wire 320 as the conductive wire 320 exits the overmolding 310. The conductive wire 320 may include an electrically insulating layer (not shown) surrounding a conductive portion of the conductive wire. In operation, shield 315 contains the wave on the surface of the conductive wire 320, which reduces or eliminates radiated EMI from the surface wave. Because EMI magnitude decreases exponentially with distance, the length and composition of shield 315 may be selected to provide sufficient protection against radiated EMI. In an embodiment, shield 315 may be formed from various EMI-reducing materials, such as a powdered-ferrite sintered encapsulation. Additional structures may be used to reduce EMI, such as the structure shown in FIG. 4.

Figure 4:
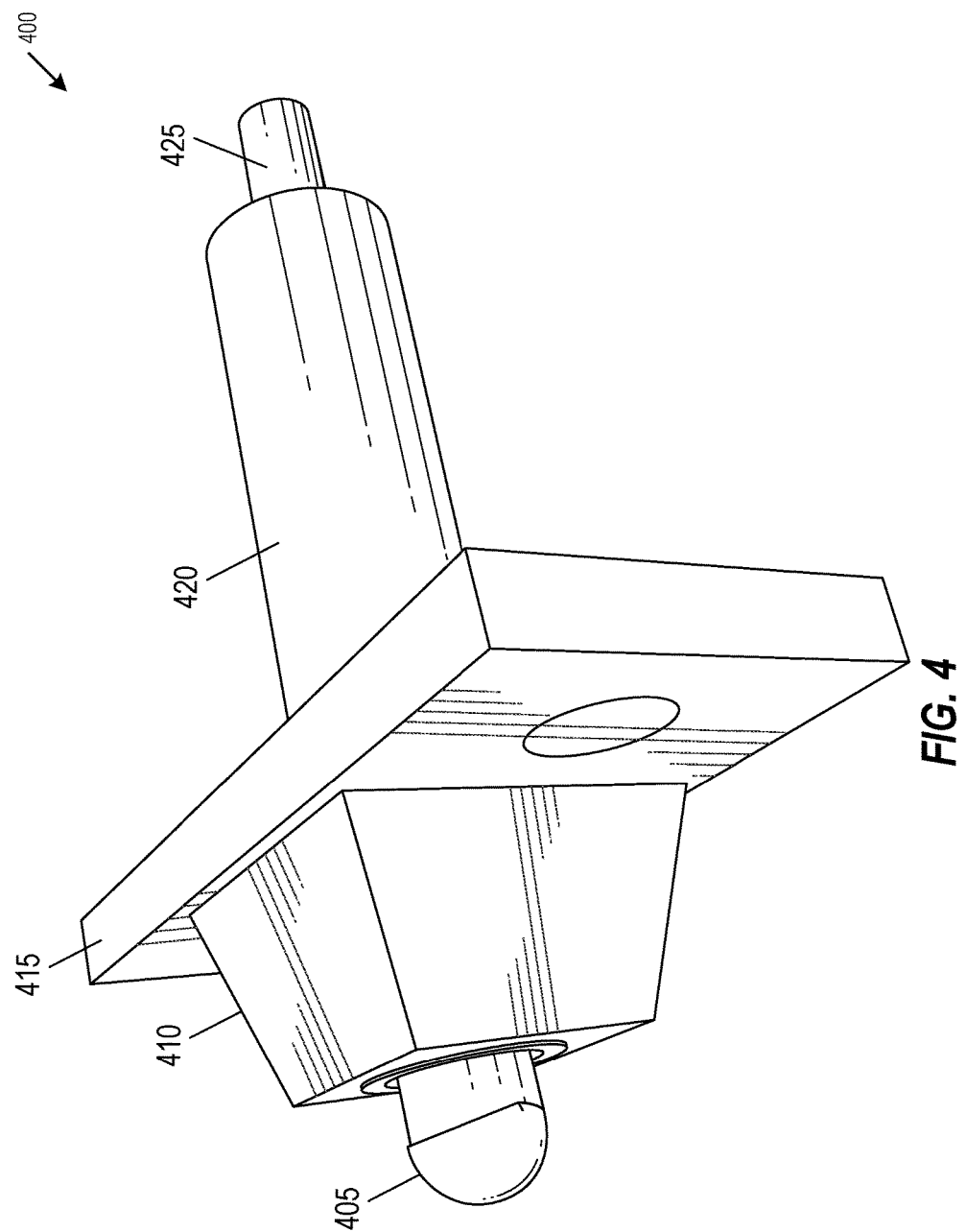
FIG. 4 is a diagram of a second SWC contact, in accordance with at least one embodiment of the invention.

FIG. 4 is a diagram of a second SWC contact 400, in accordance with at least one embodiment of the invention. Similar to the first SWC contact 300, the second SWC contact 400 includes a contact pin 405 surrounded by a horn overmolding 410, where horn overmolding 410 may be shaped to match an interior structure of a horn launcher receptacle. A conductive wire 425 is conductively coupled to the contact pin 405, and a conductive shield 420 covers a portion of the conductive wire 425 to reduce EMI. To reduce EMI further, an overmolding shield 425 may be disposed between the horn overmolding 410 and the conductor shield 420. The overmolding shield 425 may be formed from various EMI-reducing materials, such as a powdered ferrite. In an embodiment, the overmolding shield 425 and the conductor shield 420 are formed as a single component. The size and shape of the overmolding shield 425 may be selected to provide an attachment point while providing EMI reduction. Multiple second SWC contacts 400 may be arranged in close proximity to each other, and may form a contact array within an electronic device. In an example, multiple second SWC contacts 400 may be used in the small-outline dual in-line memory module (SO-DIMM) shown in FIG. 5.

Figure 5:
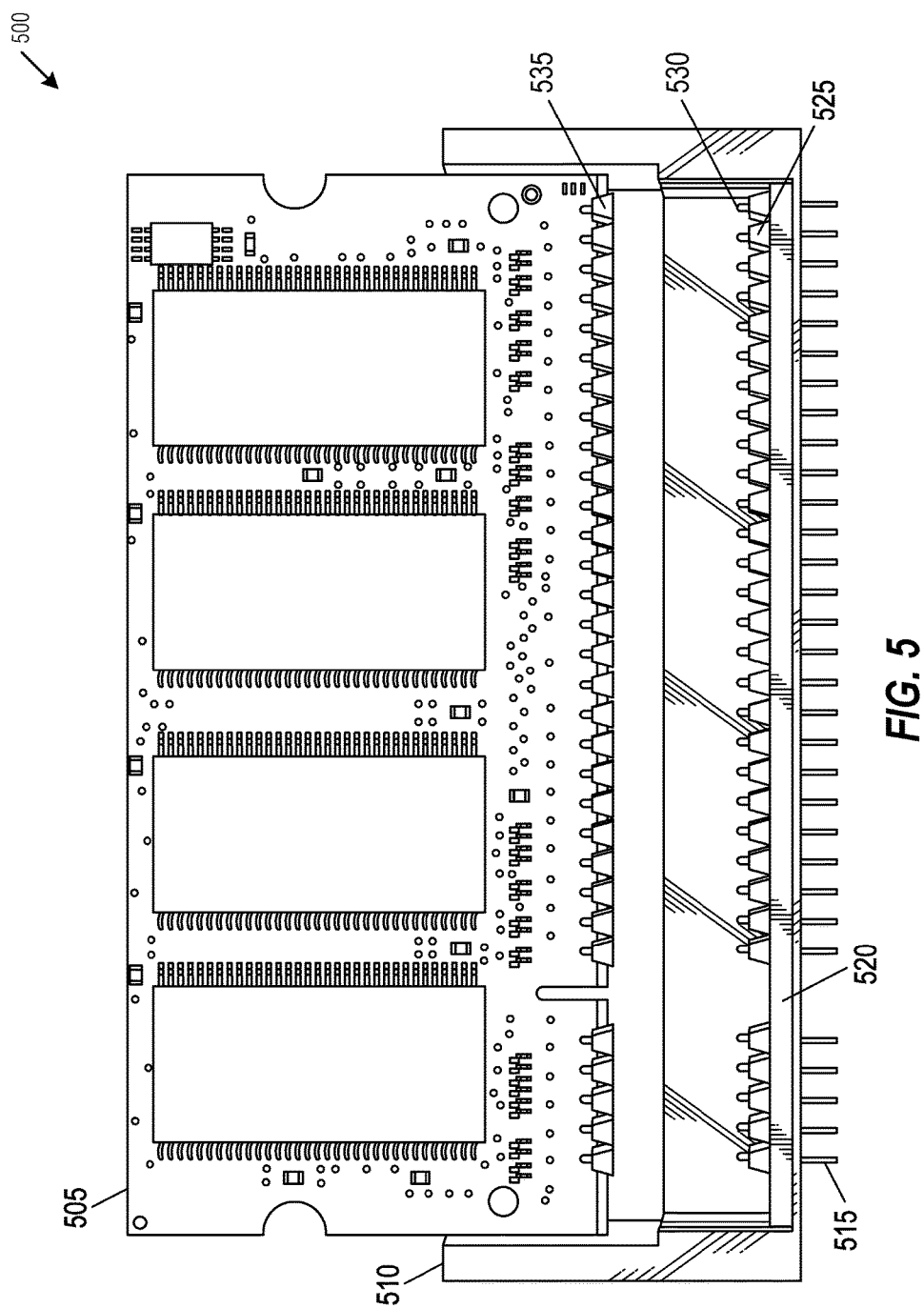
FIG. 5 is a diagram of a SWC memory module, in accordance with at least one embodiment of the invention.

FIG. 5 is a diagram of a SWC memory module 500, in accordance with at least one embodiment of the invention. In an embodiment, SWC memory module 500 includes a removable SO-DIMM card 505 that may be inserted into socket 510. Socket 510 includes an array of conductive posts 515, which may be soldered to a PCB or other electronic structure to provide a mechanical and electrical connection. Each of the conductive posts 515 is connected through a bar 520 and though a horn mating portion 525 to a SWC contact pin 530. Bar 520 may provide mounting (e.g., mechanical strain relief for solder pins 515) and electromagnetic shielding. In particular, bar 520 provides a mechanical rigidity and an inductive surface to reduce or eliminate crosstalk. In an embodiment, bar 520 is formed from powdered ferrite that is molded and sintered in a desired form. Bar 520 may subsequently be overmolded in metalized plastic or another material that provides desired electrical and mechanical properties. In an embodiment, the bar 520 may subsequently be overmolded within the socket 510.

The a horn mating portions 525 and the SWC contact pins 530 are formed in rows to provide one contact for each SO-DIMM horn launcher 535. When the SO-DIMM card 505 is fully inserted into the socket 510, each horn mating portion 525 will be fully inserted into each corresponding horn launcher 535. Multiple rows of horn mating portion 525, SWC contact pins 530, and horn launchers 535 may form a 2-D array, though other contact pin configurations may be used. The arrangement of horn launchers 535 may be used to allow connections to specific arrangements of horn mating portion 525 to reduce or eliminate a mismatch between the SO-DIMM card 505 and the socket 510, such as a mismatch in data speed, channel bandwidth, SO-DIMM card type, or other mismatches. Similarly, the individual horn launchers 535 and horn mating portions 525 may be "keyed" to allow mating in a specific configuration, such as using a tab and slot keying arrangement. SWC contact pins 530 may convey different signals, where each signal may have a unique bandwidth allocation, a unique frequency, or other predetermined characteristics. Similarly, individual horn launchers 535 may use various horn structures to provide for specific characteristics, such as to provide keying to specify different rows or lanes to provide for different voltages or voltage swings. For example, of horn launchers 535 may include a few conical horn launcher structures, a few pyramidal horn launcher structures, a few parabolic horn launcher structures, and other structures. Because SWC technology often includes very high pass band characteristics with very high channel bandwidth, the matching of bandwidth (e.g., such as through the described keying) or other signal characteristics can significantly improve the ability of the SWC to reduce EMI crosstalk.

The card 505 and horn launchers 535 may be formed using a 2.5 DH process or another PCB manufacturing process. Though SWC memory module 500 shows a SO-DIMM embodiment, a similar structure of horn mating portions 525 and horn launchers 535 may be used for PCI Express (PCIe), Next Generation Form Factor (NGFF, M.2), board-to-board, board-to-flex, or for any other printed circuit board (PCB) connector assembly. Additionally, the presence of horn launchers 535 or horn mating portions 525, keyed or otherwise, may be useful in detecting infringement.

The SWC memory module 500 provides various advantageous features. For example, SWC memory module 500 may be used within hybrid memory modules that combine fast but small memory (e.g., random-access memory (RAM)) or larger but slower memory (e.g., read-only memory (ROM). Some solutions to combining these types of memory include the use of persistent memory, phase-change memory, magneto-optical drives, and others. However, data speed (e.g., throughput) limitations on the interfaces between RAM and ROM limit the ability to combine existing RAM and ROM technologies. For example, some existing PCI Express modules using differential signaling may have an associated throughput of around 10 Gbps. To provide for a desired transfer rate of 1 Tbps, even if the maximum realizable throughput were 40 Gbps, this would require 25 differential lines to realize the desired transfer rate of 1 Tbps. In contrast, SWC memory module 500 provides speeds exceeding 100 Gbps for each non-differential single-wire (i.e., not requiring a differential second wire), 1 Tbps may be realized using 10 of the contacts within the SWC memory module 500.

The SWC memory module 500 provides an interface with a sufficiently high throughput to match RAM performance and expectations. For example, the SWC memory module 500 may enable a SWC-connected external cache to operate at speeds approximating those of a cache connected directly to a central processing unit (CPU). Similarly, the use of the SWC memory module 500 may provide an interface to removable high-speed modules. When using external memory (e.g., removable memory) as a second-line memory, then the external memory performance is improved significantly when the interface is fast enough to make the external memory appear as if it were manufactured on the same circuit board. The use of such a removable external memory module is advantageous because removable memory is typically cheaper and easier to modify during manufacturing or to modify by an end-user. Examples of memory modules that may take advantage of the SWC memory module 500 speeds include next generation interfaces for Second Level Memory, PCI Express 4.0/5.0, Optane Memory Modules, and other interface for memory, display, or sensors.

Figure 6:
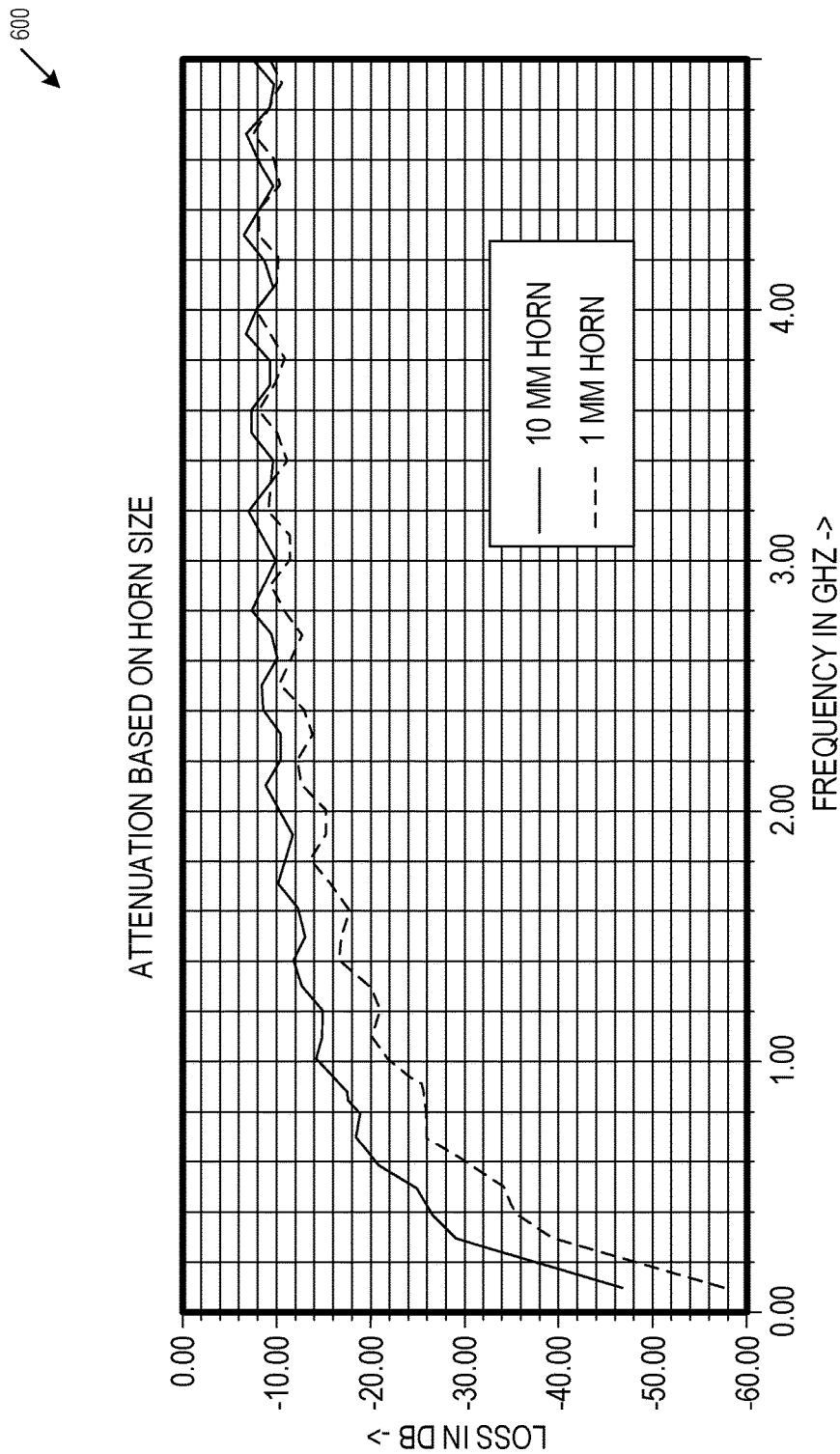
FIG. 6 depicts an attenuation graph, in accordance with at least one embodiment of the invention.

FIG. 6 depicts an attenuation graph 600, in accordance with at least one embodiment of the invention. Attenuation graph 600 shows the attenuation of a 1 mm horn launcher and the attenuation of a 10 mm horn launcher, each as a function of frequency. Both show an overall reduction in attenuation as a function of increasing frequency, consistent with SWC loss 100 shown in FIG. 1. The 10 mm horn launcher shows a greater reduction in attenuation at lower frequencies. As such, a desired cutoff frequency may be provided by selection of horn launcher size.

Figure 7:
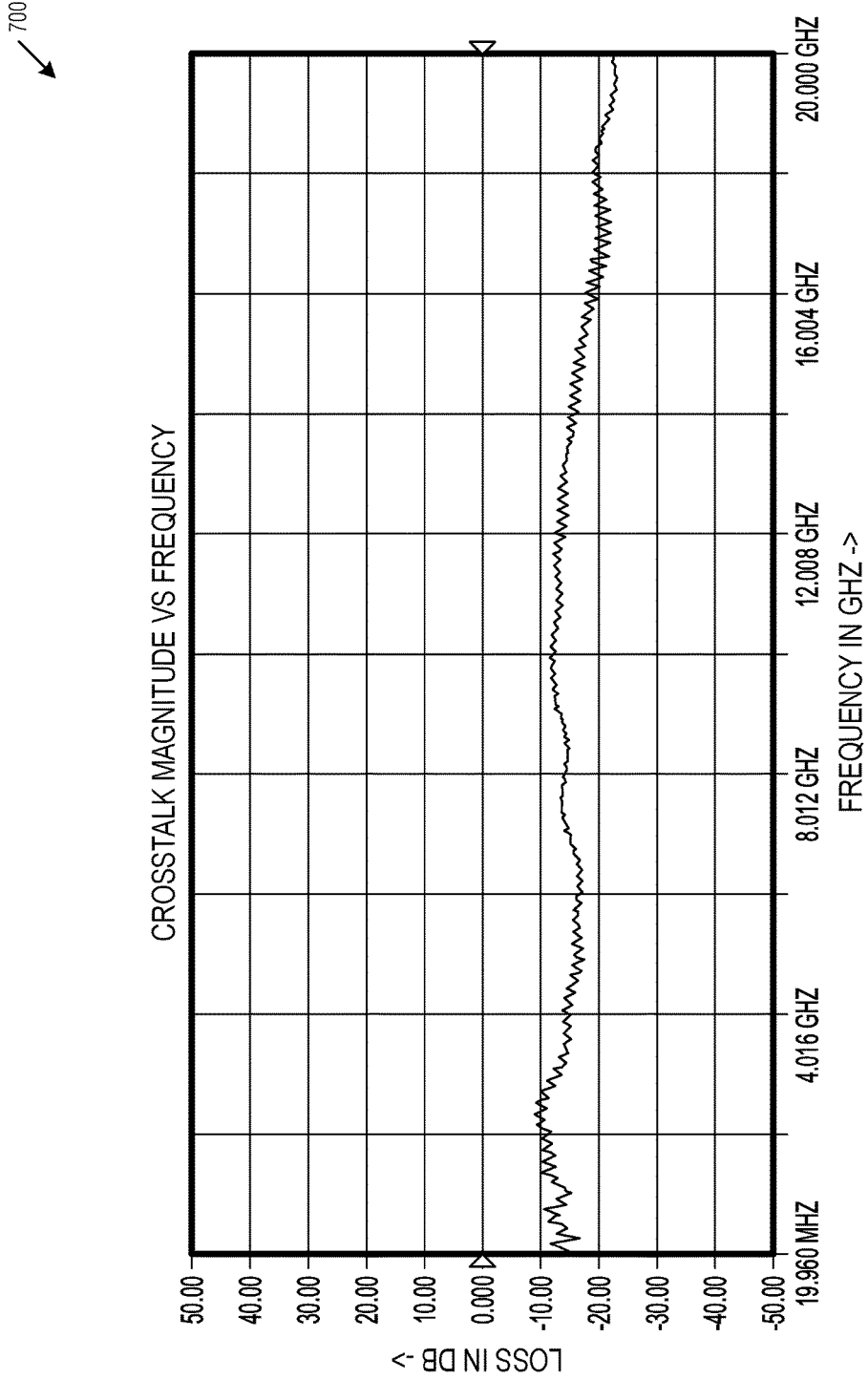
FIG. 7 depicts a crosstalk graph, in accordance with at least one embodiment of the invention.

FIG. 7 depicts a crosstalk graph 700, in accordance with at least one embodiment of the invention. Graph 700 shows crosstalk loss as a function of frequency for a hand-made horn launcher. Graph 700 shows that the attenuation is relatively flat and is stable for higher frequencies. This consistency in the higher frequencies is in contrast to the higher frequency increased attenuation (i.e., roll-off) that is exhibited by typical transmission lines, such as the roll-off shown in FIG. 1.

Figure 8:
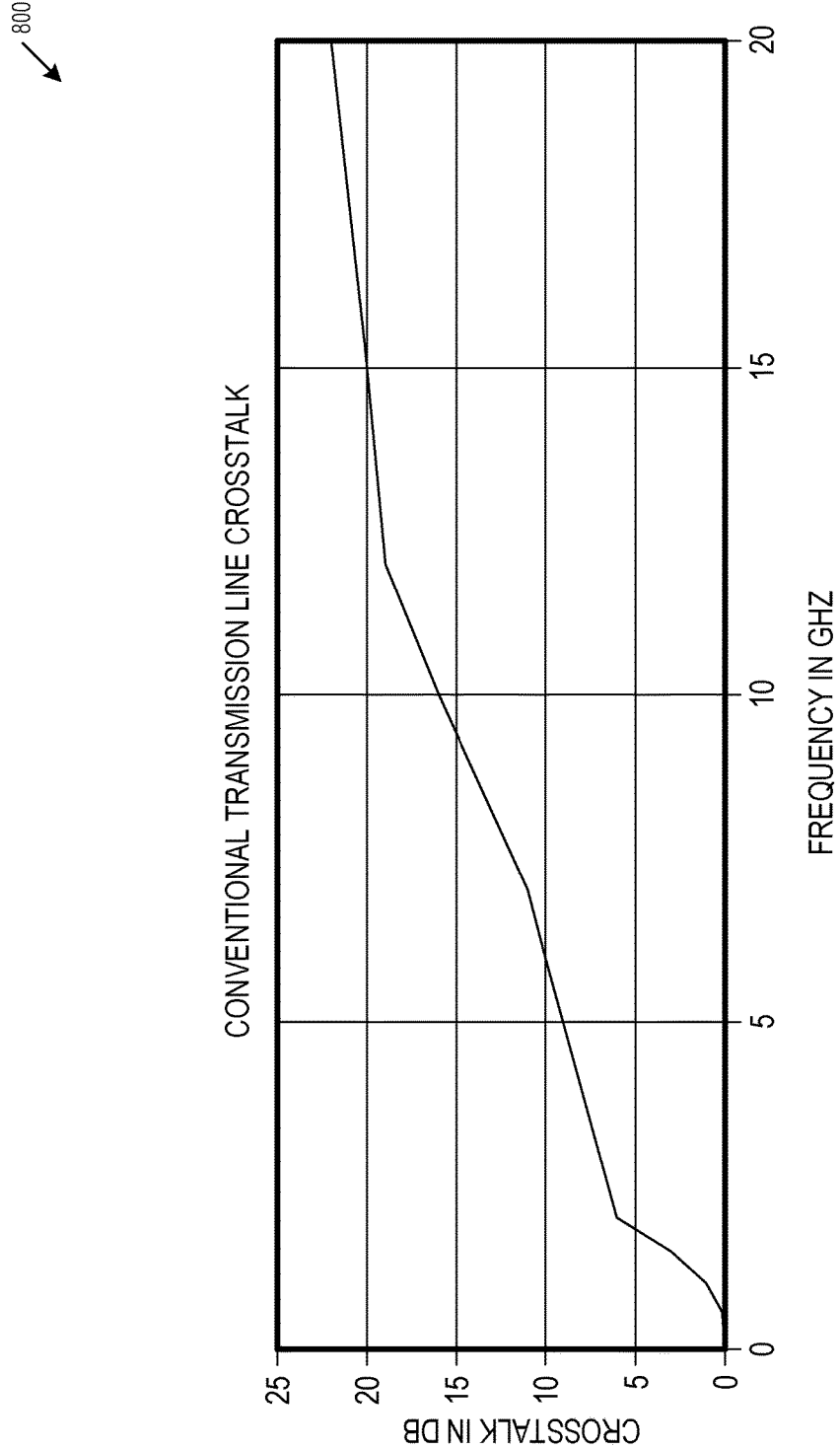
FIG. 8 depicts a transmission line crosstalk graph, in accordance with at least one embodiment of the invention.

FIG. 8 depicts a transmission line crosstalk graph 800, in accordance with at least one embodiment of the invention. Graph 800 shows the crosstalk exhibited by a typical transmission line, which increases as a function of frequency. This demonstrates the limited usefulness of a typical transmission line for higher frequency signals, such as those used in increased bandwidth signals.

Figure 9:
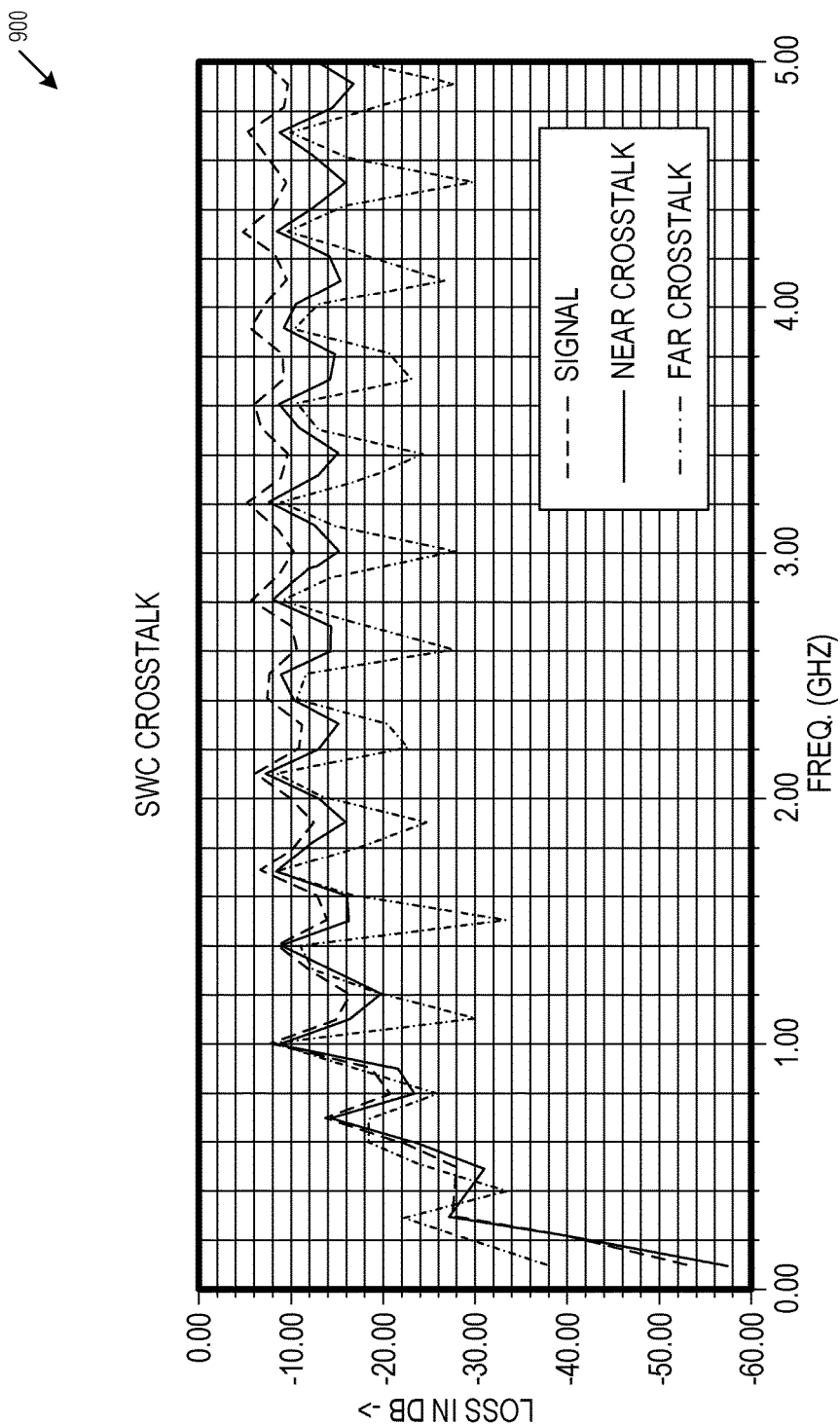
FIG. 9 depicts a SWC crosstalk graph, in accordance with at least one embodiment of the invention.

FIG. 9 depicts a SWC crosstalk graph 900, in accordance with at least one embodiment of the invention. Graph 900 shows cross-coupling as a function of frequency. The transmission signal (i.e., the input to the horn launcher), shows the lowest attenuation at higher frequencies. The near crosstalk corresponds to crosstalk at the exit of the horn launcher and the entry point of the SWC line, which exhibits slightly lower attenuation than the transmission signal. The far crosstalk corresponds to crosstalk at the far end of the SWC line, which exhibits significant variations in the crosstalk. The length and inductive properties of shielding at SWC line entry point and SWC line far end may be selected to provide for desired attenuation characteristics.

Figure 10:
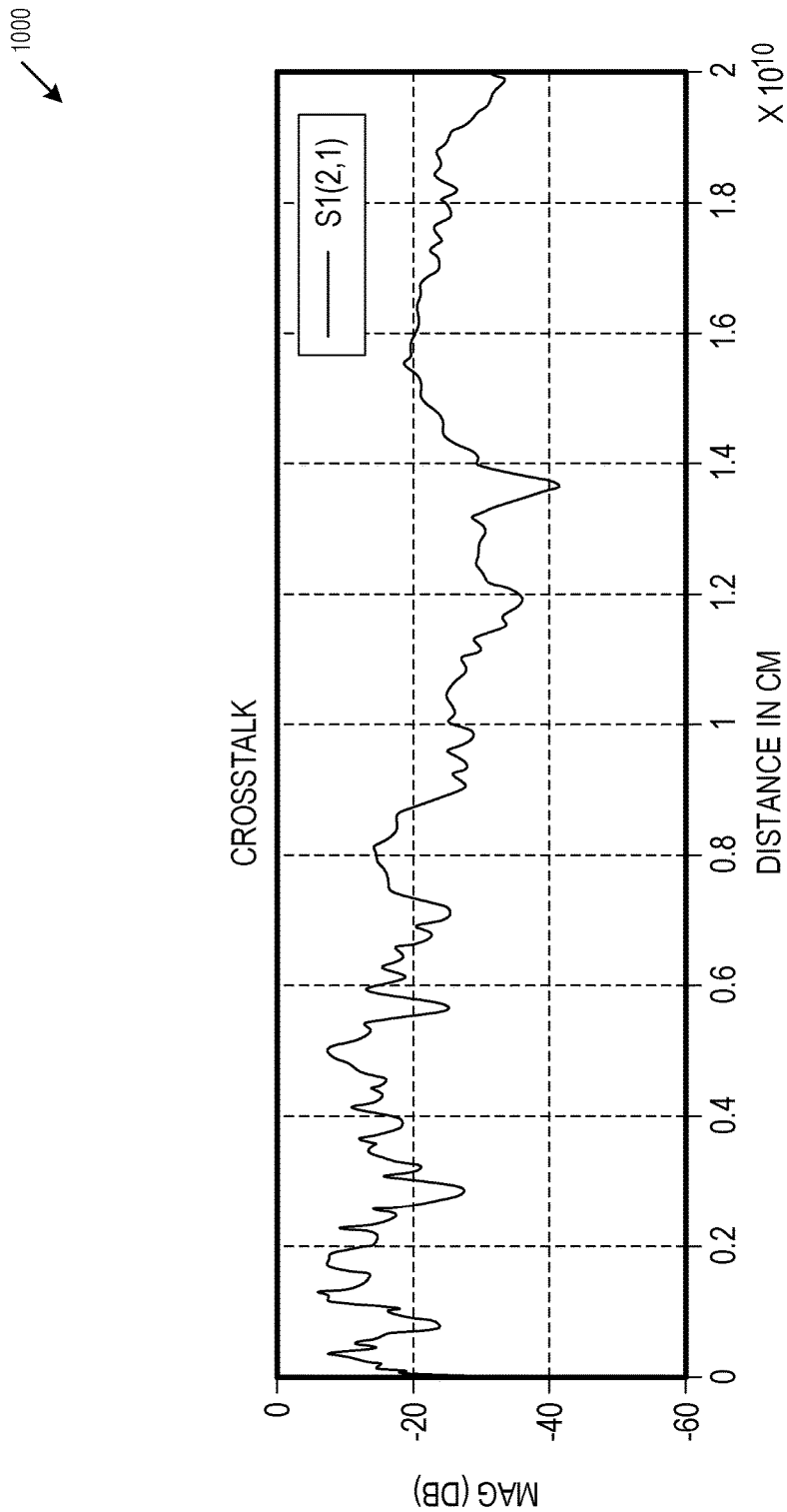
FIG. 10 depicts a non-launched SWC line graph, in accordance with at least one embodiment of the invention.

FIG. 10 depicts a non-launched SWC line graph 1000, in accordance with at least one embodiment of the invention. The SWC line graph 1000 was generated using a SWC line whose horn launcher was removed. In contrast with the relatively stable crosstalk graph 900, the non-launched SWC line graph 1000 shows an increasing but irregular crosstalk magnitude as a function of increasing distance from the SWC line entry point. The horn launcher presence, size, and other configuration parameters may be selected based on desired SWC throughput, SWC line length, or other parameters.

Figure 11:
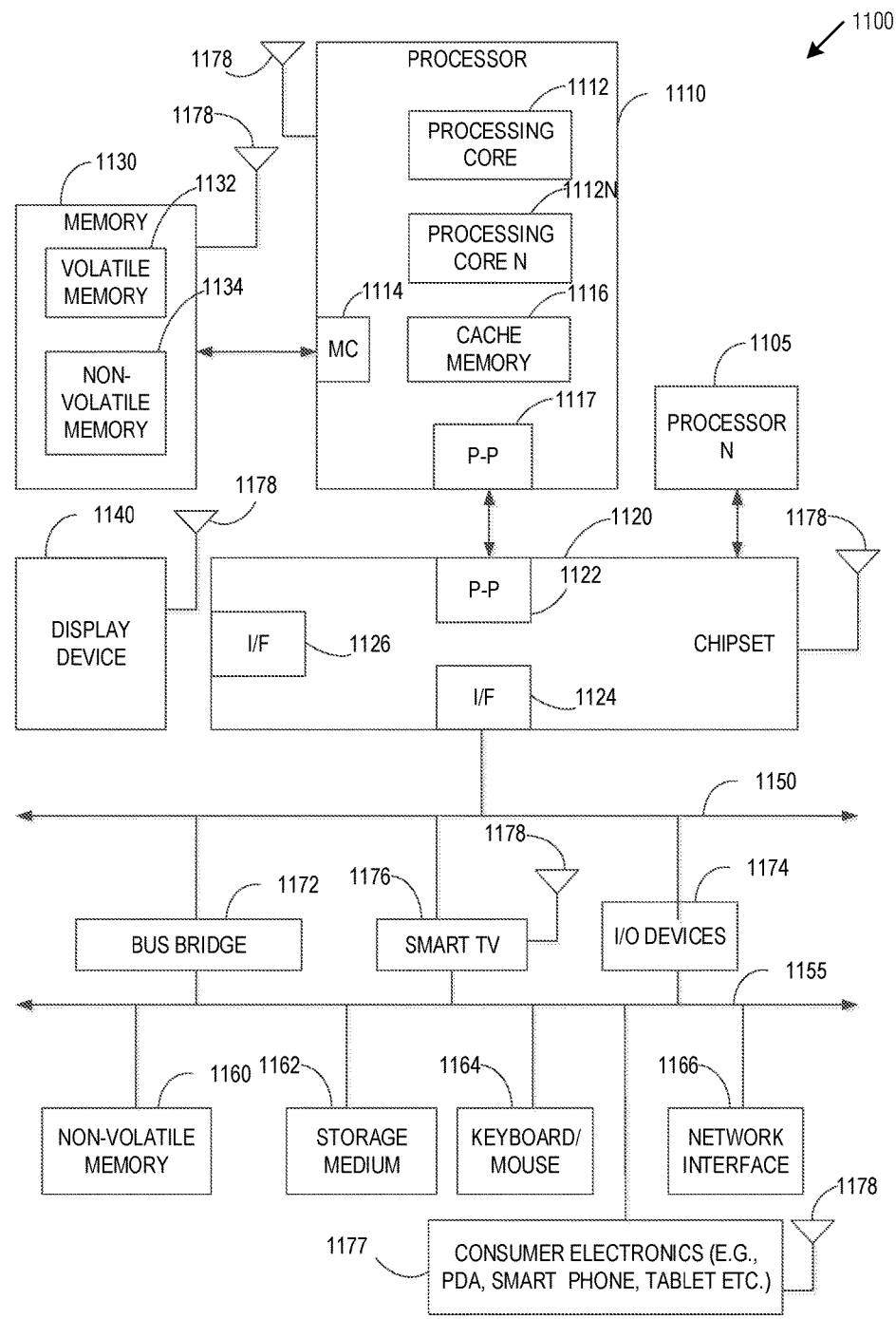
FIG. 11 illustrates a system level diagram, in accordance with at least one embodiment of the invention.

FIG. 11 illustrates a system level diagram 1100, in accordance with at least one embodiment of the invention. For instance, FIG. 11 depicts an example of an electronic device (e.g., system) including a SWC connection as described in the present disclosure. FIG. 11 is included to show an example of a higher level device application. In one embodiment, the system includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 1100 is a system on a chip (SOC) system.

In one embodiment, processor 1110 has one or more processing cores 1112 and 1112N, where 1112N represents the Nth processor core inside processor 1110 where N is a positive integer. In one embodiment, system 1100 includes multiple processors including 1110 and 1105, where processor 1105 has logic similar or identical to the logic of processor 1110. In some embodiments, processing core 1112 includes, but is not limited to, pre-fetch logic to fetch instructions, decode logic to decode the instructions, execution logic to execute instructions, and the like. In some embodiments, processor 1110 has a cache memory 1116 to cache instructions and/or data for system 1100. Cache memory 1116 may be organized into a hierarchal structure including one or more levels of cache memory 1116.

In some embodiments, processor 1110 includes a memory controller 1114, which is operable to perform functions that enable the processor 1110 to access and communicate with memory 1130 that includes a volatile memory 1132 and/or a non-volatile memory 1134. In some embodiments, processor 1110 is coupled with memory 1130 and chipset 1120. Processor 1110 may also be coupled to a wireless antenna 1178 to communicate with any device configured to transmit and/or receive wireless signals. In one embodiment, the wireless antenna interface 1178 operates in accordance with, but is not limited to, the IEEE 802.11 standard and its related family, Home Plug AV (HPAV), Ultra-Wide Band (UWB), Bluetooth, WiMax, or any form of wireless communication protocol.

In some embodiments, volatile memory 1132 includes, but is not limited to, synchronous dynamic random access memory (SDRAM), dynamic random access memory (DRAM), RAMBUS dynamic random access memory (RDRAM), and/or any other type of random access memory device. Non-volatile memory 1134 includes, but is not limited to, flash memory, phase change memory (PCM), read-only memory (ROM), electrically erasable programmable read-only memory (EEPROM), or any other type of non-volatile memory device.

Memory 1130 stores information and instructions to be executed by processor 1110. In one embodiment, memory 1130 may also store temporary variables or other intermediate information while processor 1110 is executing instructions. In the illustrated embodiment, chipset 1120 connects with processor 1110 via Point-to-Point (PtP, P-P, P2P) interfaces 1117 and 1122. Chipset 1120 enables processor 1110 to connect to other elements in system 1100. In some embodiments, interfaces 1117 and 1122 operate in accordance with a PtP communication protocol such as the Intel® QuickPath Interconnect (QPI) or the like. In other embodiments, a different interconnect may be used.

In some embodiments, chipset 1120 is operable to communicate with processor 1110, 1105, display device 1140, and other devices 1172, 1176, 1174, 1160, 1162, 1164, 1166, 1177, and so forth. Chipset 1120 may also be coupled to a wireless antenna 1178 to communicate with any device configured to transmit and/or receive wireless signals.

Chipset 1120 connects to display device 1140 via interface 1126. Display device 1140 may be, for example, a liquid crystal display (LCD), a plasma display, cathode ray tube (CRT) display, or any other form of visual display device. In some embodiments, processor 1110 and chipset 1120 are merged into a single SOC. In addition, chipset 1120 connects to one or more buses 1150 and 1155 that interconnect various elements 1174, 1160, 1162, 1164, and 1166. Buses 1150 and 1155 may be interconnected together via a bus bridge 1172. In one embodiment, chipset 1120 couples with a non-volatile memory 1160, mass storage device(s) 1162, keyboard/mouse 1164, and network interface 1166 via interface 1124 and/or 1104, smart TV 1176, consumer electronics 1177, and so forth.

In one embodiment, mass storage device 1162 includes, but is not limited to, a solid state drive, a hard disk drive, a universal serial bus flash memory drive, or any other form of computer data storage medium. In one embodiment, network interface 1166 is implemented by any type of well-known network interface standard including, but not limited to, an Ethernet interface, a universal serial bus (USB) interface, a peripheral component interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 11 are depicted as separate blocks within the system 1100, the functions performed by some of these blocks may be integrated within a single semiconductor circuit or may be implemented using two or more separate integrated circuits. For example, although cache memory 1116 is depicted as a separate block within processor 1110, cache memory 1116 (or selected aspects of 1116) can be incorporated into processor core 1112.

To better illustrate the method and apparatuses disclosed herein, a non-limiting list of embodiments is provided here.

Example 1 is a communication apparatus comprising: a contact pin; a single-wire transmission line conductively coupled to the contact pin; and a first overmolding formed around the contact pin and single-wire transmission line, the first overmolding structured to provide a removable friction fit within a communication horn launcher, the single-wire transmission line to receive a signal from the contact pin and from the communication horn launcher and to propagate the signal as a transverse electromagnetic wave along an outer surface of the single-wire transmission line.

In Example 2, the subject matter of Example 1 optionally includes wherein the communication horn launcher is attached to a memory module, the memory module to provide the signal through the contact pin to the single-wire transmission line.

In Example 3, the subject matter of Example 2 optionally includes wherein the memory module includes a SO-DIMM module.

In Example 4, the subject matter of any one or more of Examples 1-3 optionally include wherein: the first overmolding includes a capacitive overmolding material; the communication horn launcher includes a capacitive launcher material; and the capacitive overmolding material is capacitively coupled with the capacitive launcher material.

In Example 5, the subject matter of Example 4 optionally includes wherein the capacitive overmolding material includes barium titanate.

In Example 6, the subject matter of any one or more of Examples 1-5 optionally include wherein the first overmolding includes a partial pyramidal structure.

In Example 7, the subject matter of any one or more of Examples 1-6 optionally include a second overmolding disposed coaxially on a portion of the single-wire transmission line proximate to the first overmolding, the second overmolding to reduce electromagnetic interference with a proximate conductor.

In Example 8, the subject matter of Example 7 optionally includes wherein the first overmolding includes a transverse mounting flange.

In Example 9, the subject matter of Example 8 optionally includes wherein the transverse mounting flange is adjacent to a proximate conductor overmolding on the proximate conductor.

In Example 10, the subject matter of Example 9 optionally includes wherein the transverse mounting flange is inductively coupled with the proximate conductor overmolding.

In Example 11, the subject matter of Example 10 optionally includes a memory module socket, wherein the transverse mounting flange is mechanically connected to the memory module socket.

In Example 12, the subject matter of any one or more of Examples 10-11 optionally include wherein the memory module socket includes a SO-DIMM memory socket.

In Example 13, the subject matter of any one or more of Examples 7-12 optionally include wherein the second overmolding includes an inductive coaxial overmolding.

In Example 14, the subject matter of Example 13 optionally includes wherein the inductive coaxial overmolding includes ferrite.

In Example 15, the subject matter of any one or more of Examples 1-14 optionally include a dielectric coating disposed coaxially on the single-wire transmission line.

In Example 16, the subject matter of any one or more of Examples 1-15 optionally include the single-wire transmission line further to receive a current from the contact pin and propagate the current along an inner portion of the single-wire transmission line.

Example 17 is a method of communicating comprising: propagating a signal from a communication horn launcher to a contact pin; propagating the signal from the contact pin through a first overmolding around the contact pin to a single-wire transmission line, the first overmolding structured to provide a removable friction fit within the communication horn launcher; and propagating the signal as a transverse electromagnetic wave along an outer surface of the single-wire transmission line.

In Example 18, the subject matter of Example 17 optionally includes wherein the communication horn launcher is attached to a memory module, the memory module to provide the signal through the contact pin to the single-wire transmission line.

In Example 19, the subject matter of Example 18 optionally includes wherein the memory module includes a SO-DIMM module.

In Example 20, the subject matter of any one or more of Examples 17-19 optionally include wherein propagating the signal includes capacitively coupling the first overmolding with the communication horn launcher.

In Example 21, the subject matter of Example 20 optionally includes wherein the first overmolding includes barium titanate.

In Example 22, the subject matter of any one or more of Examples 17-21 optionally include wherein the first overmolding includes a partial pyramidal structure.

In Example 23, the subject matter of any one or more of Examples 17-22 optionally include wherein propagating the signal from the contact pin to the single-wire transmission line includes propagating the signal through a second overmolding disposed coaxially on a portion of the single-wire transmission line proximate to the first overmolding, the second overmolding to reduce electromagnetic interference with a proximate conductor.

In Example 24, the subject matter of Example 23 optionally includes wherein the first overmolding includes a transverse mounting flange.

In Example 25, the subject matter of Example 24 optionally includes wherein the transverse mounting flange is disposed adjacent to a proximate conductor overmolding on the proximate conductor.

In Example 26, the subject matter of Example 25 optionally includes wherein the transverse mounting flange is inductively coupled with the proximate conductor overmolding.

In Example 27, the subject matter of Example 26 optionally includes wherein the transverse mounting flange is mechanically connected to a memory module socket.

In Example 28, the subject matter of Example 27 optionally includes wherein the memory module socket includes a SO-DIMM memory socket.

In Example 29, the subject matter of any one or more of Examples 23-28 optionally include wherein the second overmolding includes an inductive coaxial overmolding.

In Example 30, the subject matter of Example 29 optionally includes wherein the inductive coaxial overmolding includes ferrite.

In Example 31, the subject matter of Example 30 optionally includes wherein the second overmolding form includes sintered powdered ferrite.

In Example 32, the subject matter of any one or more of Examples 17-31 optionally include wherein propagating the signal along the outer surface of the single-wire transmission line includes propagating the signal within a dielectric coating coaxially on the single-wire transmission line.

In Example 33, the subject matter of any one or more of Examples 17-32 optionally include propagating a current through the contact pin and along an inner portion of the single-wire transmission line.

Example 34 is at least one machine-readable medium including instructions, which when executed by a computing system, cause the computing system to perform any of the methods of Examples 17-33.

Example 35 is an apparatus comprising means for performing any of the methods of Examples 17-33.

Example 36 is at least one machine-readable storage medium, comprising a plurality of instructions that, responsive to being executed with processor circuitry of a computer-controlled device, cause the computer-controlled device to: propagate a signal from a communication horn launcher to a contact pin; propagate the signal from the contact pin through a first overmolding around the contact pin to a single-wire transmission line, the first overmolding structured to provide a removable friction fit within the communication horn launcher; and propagate the signal as a transverse electromagnetic wave along an outer surface of the single-wire transmission line.

In Example 37, the subject matter of Example 36 optionally includes wherein the communication horn launcher is attached to a memory module, the memory module to provide the signal through the contact pin to the single-wire transmission line.

In Example 38, the subject matter of Example 37 optionally includes wherein the memory module includes a SO-DIMM module.

In Example 39, the subject matter of any one or more of Examples 36-38 optionally include wherein the instructions causing the computer-controlled device to propagate the signal includes instructions causing the computer-controlled device to capacitively couple the first overmolding with the communication horn launcher.

In Example 40, the subject matter of Example 39 optionally includes wherein the first overmolding includes barium titanate.

In Example 41, the subject matter of any one or more of Examples 36-40 optionally include wherein the first overmolding includes a partial pyramidal structure.

In Example 42, the subject matter of any one or more of Examples 36-41 optionally include wherein the instructions causing the computer-controlled device to propagate the signal from the contact pin to the single-wire transmission line includes instructions causing the computer-controlled device to propagate the signal through a second overmolding disposed coaxially on a portion of the single-wire transmission line proximate to the first overmolding, the second overmolding to reduce electromagnetic interference with a proximate conductor.

In Example 43, the subject matter of Example 42 optionally includes wherein the first overmolding includes a transverse mounting flange.

In Example 44, the subject matter of Example 43 optionally includes the plurality of instructions further causing the computer-controlled device to dispose the transverse mounting flange adjacent to a proximate conductor overmolding on the proximate conductor.

In Example 45, the subject matter of Example 44 optionally includes wherein the transverse mounting flange is inductively coupled with the proximate conductor overmolding.

In Example 46, the subject matter of Example 45 optionally includes wherein the transverse mounting flange is mechanically connected to a memory module socket.

In Example 47, the subject matter of Example 46 optionally includes wherein the memory module socket includes a SO-DIMM memory socket.

In Example 48, the subject matter of any one or more of Examples 42-47 optionally include wherein the second overmolding includes an inductive coaxial overmolding.

In Example 49, the subject matter of Example 48 optionally includes wherein the inductive coaxial overmolding includes ferrite.

In Example 50, the subject matter of Example 49 optionally includes wherein the second overmolding includes sintered powdered ferrite.

In Example 51, the subject matter of any one or more of Examples 36-50 optionally include wherein the instructions causing the computer-controlled device to propagate the signal along the outer surface of the single-wire transmission line includes instructions causing the computer-controlled device to propagate the signal within a dielectric coating coaxially on the single-wire transmission line.

In Example 52, the subject matter of any one or more of Examples 36-51 optionally include the plurality of instructions further causing the computer-controlled device to propagate a current through the contact pin and along an inner portion of the single-wire transmission line.

Example 53 is a communication apparatus comprising: means for propagating a signal from a communication horn launcher to a contact pin; means for propagating the signal from the contact pin through a first overmolding around the contact pin to a single-wire transmission line, the first overmolding structured to provide a removable friction fit within the communication horn launcher; and means for propagating the signal as a transverse electromagnetic wave along an outer surface of the single-wire transmission line.

In Example 54, the subject matter of Example 53 optionally includes wherein the communication horn launcher is attached to a memory module, the memory module to provide the signal through the contact pin to the single-wire transmission line.

In Example 55, the subject matter of Example 54 optionally includes wherein the memory module includes a SO-DIMM module.

In Example 56, the subject matter of any one or more of Examples 53-55 optionally include wherein means for propagating the signal includes capacitively coupling the first overmolding with the communication horn launcher.

In Example 57, the subject matter of Example 56 optionally includes wherein the first overmolding includes barium titanate.

In Example 58, the subject matter of any one or more of Examples 53-57 optionally include wherein the first overmolding includes a partial pyramidal structure.

In Example 59, the subject matter of any one or more of Examples 53-58 optionally include wherein means for propagating the signal from the contact pin to the single-wire transmission line includes means for propagating the signal through a second overmolding disposed coaxially on a portion of the single-wire transmission line proximate to the first overmolding, the second overmolding to reduce electromagnetic interference with a proximate conductor.

In Example 60, the subject matter of Example 59 optionally includes wherein the first overmolding includes a transverse mounting flange.

In Example 61, the subject matter of Example 60 optionally includes means for disposing the transverse mounting flange adjacent to a proximate conductor overmolding on the proximate conductor.

In Example 62, the subject matter of Example 61 optionally includes wherein the transverse mounting flange is inductively coupled with the proximate conductor overmolding.

In Example 63, the subject matter of Example 62 optionally includes wherein the transverse mounting flange is mechanically connected to a memory module socket.

In Example 64, the subject matter of Example 63 optionally includes wherein the memory module socket includes a SO-DIMM memory socket.

In Example 65, the subject matter of any one or more of Examples 59-64 optionally include wherein the second overmolding includes an inductive coaxial overmolding.

In Example 66, the subject matter of Example 65 optionally includes wherein the inductive coaxial overmolding includes ferrite.

In Example 67, the subject matter of Example 66 optionally includes wherein the second overmolding form includes sintered powdered ferrite.

In Example 68, the subject matter of any one or more of Examples 53-67 optionally include wherein means for propagating the signal along the outer surface of the single-wire transmission line includes means for propagating the signal within a dielectric coating coaxially on the single-wire transmission line.

In Example 69, the subject matter of any one or more of Examples 53-68 optionally include means for propagating a current through the contact pin and along an inner portion of the single-wire transmission line.

Example 70 is at least one machine-readable medium including instructions, which when executed by a machine, cause the machine to perform operations of any of the operations of Examples 1-69.

Example 71 is an apparatus comprising means for performing any of the operations of Examples 1-69.

Example 72 is a system to perform the operations of any of the Examples 1-69.

Example 73 is a method to perform the operations of any of the Examples 1-69.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure quickly. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A communication apparatus comprising:
   a contact pin;
   a single-wire transmission line conductively coupled to the contact pin; and
   a first overmolding including a capacitive overmolding material formed around the contact pin and single-wire transmission line, the first overmolding structured to provide a removable friction fit within a communication horn launcher, the communication horn launcher including a capacitive launcher material to be capacitively coupled with the capacitive overmolding material, the single-wire transmission line to receive a signal from the contact pin and from the communication horn launcher and to propagate the signal as a transverse electromagnetic wave along an outer surface of the single-wire transmission line.

2. The apparatus of claim 1, wherein the communication horn launcher is attached to a memory module, the memory module to provide the signal through the contact pin to the single-wire transmission line.

3. The apparatus of claim 2, wherein the memory module includes a SO-DIMM module.

4. The apparatus of claim 1, wherein the capacitive overmolding material includes barium titanate.

5. The apparatus of claim 1, wherein the first overmolding includes a partial pyramidal structure.

6. The apparatus of claim 1, further including a second overmolding disposed coaxially on a portion of the single-wire transmission line proximate to the first overmolding, the second overmolding to reduce electromagnetic interference with a proximate conductor.

7. The apparatus of claim 6, wherein the first overmolding includes a transverse mounting flange.

8. The apparatus of claim 7, wherein the transverse mounting flange is adjacent to a proximate conductor overmolding on the proximate conductor.

9. The apparatus of claim 8, wherein the transverse mounting flange is inductively coupled with the proximate conductor overmolding.

10. The apparatus of claim 9, further including a memory module socket, wherein the transverse mounting flange is mechanically connected to the memory module socket.

11. The apparatus of claim 9, wherein the memory module socket includes a SO-DIMM memory socket.

12. The apparatus of claim 6, wherein the second overmolding includes an inductive coaxial overmolding.

13. The apparatus of claim 1, further including a dielectric coating disposed coaxially on the single-wire transmission line.

14. The apparatus of claim 1, the single-wire transmission line further to receive a current from the contact pin and propagate the current along an inner portion of the single-wire transmission line.

15. A method of communicating comprising:
   propagating a signal from a communication horn launcher to a contact pin, the communication horn launcher including a capacitive launcher material;
   overmolding including a capacitive overmolding material capacitively
   propagating the signal from the contact pin through a first overmolding around the contact pin to a single-wire transmission line, the first a contact pin, the communication horn launcher including a capacitive launcher material;
   overmolding including a capacitive overmolding material capacitively coupled to the communication horn launcher and structured to provide a removable friction fit within the communication horn launcher; and
   propagating the signal as a transverse electromagnetic wave along an outer surface of the single-wire transmission line.

16. The method of claim 15, wherein the communication horn launcher is attached to a memory module, the memory module to provide the signal through the contact pin to the single-wire transmission line.

17. The method of claim 16, wherein the memory module includes a SO-DIMM module.

18. The method of claim 15, wherein propagating the signal from the contact pin to the single-wire transmission line includes propagating the signal through a second overmolding disposed coaxially on a portion of the single-wire transmission line proximate to the first overmolding, the second overmolding to reduce electromagnetic interference with a proximate conductor.

19. The method of claim 15, further including propagating a current through the contact pin and along an inner portion of the single-wire transmission line.

20. At least one non-transitory machine-readable storage medium, comprising a plurality of instructions that, responsive to being executed with processor circuitry of a computer-controlled device, cause the computer-controlled device to:
   propagate a signal from a communication horn launcher to a contact pin, the communication horn launcher including a capacitive launcher material;
   overmolding including a capacitive overmolding material capacitively
   propagate the signal from the contact pin through a first overmolding around the contact pin to a single-wire transmission line, the first a contact pin, the communication horn launcher including a capacitive launcher material;
   overmolding including a capacitive overmolding material capacitively coupled to the communication horn launcher and structured to provide a removable friction fit within the communication horn launcher; and
   propagate the signal as a transverse electromagnetic wave along an outer surface of the single-wire transmission line.

21. The machine-readable medium of claim 20, wherein the instructions causing the computer-controlled device to propagate the signal from the contact pin to the single-wire transmission line includes instructions causing the computer-controlled device to propagate the signal through a second overmolding disposed coaxially on a portion of the single-wire transmission line proximate to the first overmolding, the second overmolding to reduce electromagnetic interference with a proximate conductor.

22. The machine-readable medium of claim 20, wherein the instructions causing the computer-controlled device to propagate the signal along the outer surface of the single-wire transmission line includes instructions causing the computer-controlled device to propagate the signal within a dielectric coating coaxially on the single-wire transmission line.

* * * * *

UNITED STATES PATENT AND TRADEMARK OFFICE
CERTIFICATE OF CORRECTION

PATENT NO. : 10,366,035 B2
APPLICATION NO. : 15/473330
DATED : July 30, 2019
INVENTOR(S) : Sundaram et al.

Page 1 of 1

It is certified that error appears in the above-identified patent and that said Letters Patent is hereby corrected as shown below:

In the Claims

In Column 15, Lines 63-64, in Claim 15, after "material;", delete "overmolding including a capacitive overmolding material capacitively"

In Column 16, Lines 1-3, in Claim 15, after "first", delete "a contact pin, the communication horn launcher including a capacitive launcher material;¶"

In Column 16, Lines 36-37, in Claim 20, after "material;", delete "overmolding including a capacitive overmolding material capacitively"

In Column 16, Lines 40-42, in Claim 20, after "first", delete "a contact pin, the communication horn launcher including a capacitive launcher material;¶"

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*